(No Model.)
C. W. HINTON.
CAR COUPLING.
No. 517,950. Patented Apr. 10, 1894.
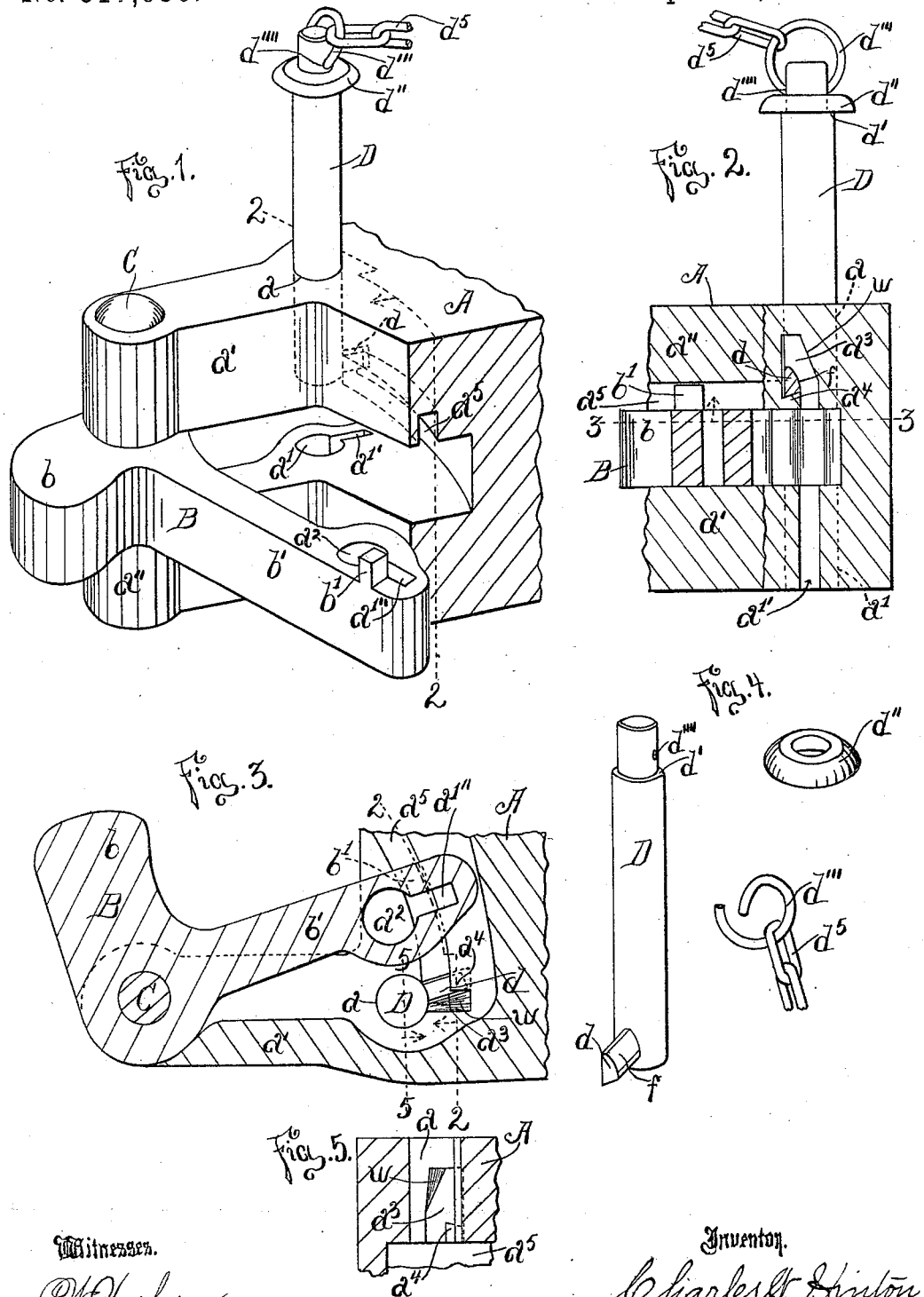
Witnesses.
P. W. Harbeson.
F. M. Townsend.
Inventor.
Charles W. Hinton
By Hazard & Townsend
His Attys.

UNITED STATES PATENT OFFICE.

CHARLES W. HINTON, OF LOS ANGELES, CALIFORNIA.

CAR-COUPLING.

SPECIFICATION forming part of Letters Patent No. 517,950, dated April 10, 1894.

Application filed January 3, 1894. Serial No. 495,511. (No model.)

*To all whom it may concern:*

Be it known that I, CHARLES W. HINTON, a citizen of the United States, residing at Los Angeles, in the county of Los Angeles and State of California, have invented new and useful Improvements in Car-Couplers, of which the following is a specification.

My invention relates to car couplers in which the coupling is effected by means of laterally swinging hooks, knuckles or jaws which are pivoted to the draw bar and are arranged to be fastened so that the knuckles of both couplings are held rigid when the coupling is effected.

The object of my invention is to provide a combination or mechanism in which a pin is employed for securing the knuckle and in which such pin will operate automatically to drop into the knuckle locking position when the knuckle is swung into its coupled position, and in which combination, the pin will be operated upon automatically by the act of raising it to so adjust the pin that it will be held in its elevated position until the knuckle is swung out and again swung fully back into its coupled position; and in which the return of the knuckle to its coupled position will operate to release the pin and allow it to fall into its locking position.

The accompanying drawings illustrate my invention.

Figure 1 is a fragmental perspective view showing enough parts of a coupler to illustrate my invention. Fig. 2 is a vertical section indicated by line 2—2 Figs. 1 and 2 looking in the direction indicated by the dotted arrow which touches the line 2—2. Fig. 3 is a horizontal section on line indicated by 3—3 Fig. 2 looking up. Fig. 4 shows in detail, the pin, the protecting washer and the washer and chain securing ring; which elements adapt the pin for application to the cast drawhead. Fig. 5 is a fragmental section on line 5—5 Fig. 3 looking in the direction indicated by the arrow which touches the line 5—5.

A indicates the drawhead.

B indicates the knuckle pivoted thereto by the pivot C.

D indicates the pin provided with the pin supporting cam or lug $d$ which projects from the lower end of the pin and serves to sustain the pin when elevated, as will hereinafter be described, and also prevents the pin from being drawn out of the pin hole $a$. The top of the pin is provided with a shoulder $d'$ upon which rests the washer $d''$ which is secured in place by the ring $d'''$ inserted through a hole $d''''$ above the shoulder.

The drawhead A comprises the two jaws $a'$ and $a''$ provided respectively with the pin hole $a$ and $a^1$. The pin holes $a$ and $a^1$ are provided with the extension or cam slot $a^{1'}$ opening into such pin hole to allow the downward passage of the cam or lug $d$ when the pin is lowered into its locking position.

The knuckle B comprises the hook $b$ and the shank $b^1$. The shank $b^1$ is provided with a pin hole $a^2$ which is provided with the cam slot $a^{1''}$ arranged with such relation to the shank that when the knuckle is in its coupled position the cam slot $a^{1'}$ and $a^{1''}$ will register with each other thus to allow the pin with its cam to pass downward through the knuckle and lower jaw. The upper portion of the cam slot is widened to form a cam and lug receiving chamber $a^3$ having one wall inclined across the top of such chamber, and having its other wall arranged to form a cam supporting shoulder $a^4$. The cam receiving chamber $a^3$ is practically an upward continuation of the cam slot $a^{1'}$ and $a^{1''}$ and the lower portion of such chamber is arranged vertically in line with the cam slot $a^{1'}$ in the lower jaw. The wall $w$ of the chamber $a^3$ which is opposite the cam supporting shoulder $a^4$ is inclined across the top of the chamber toward the side on which the shoulder is located so that when the pin is drawn up to bring the cam to the top of the chamber $a^3$ the inclined wall will operate upon the cam $d$ to force it into position above the shoulder $a^4$ so that when the pin drops from its fully elevated position the cam will rest upon or be supported by the shoulder $a^4$, or the lug $b^1$ thus holding the pin elevated above the mouth of the drawhead and the knuckle and allowing the knuckle to pass into the drawhead into its coupled position. In order to provide for disengaging the pin when the knuckle is thrown into its coupled position, and thus to automatically lock the coupling when the knuckle is thrown into such position, I provide the shank of the knuckle with the cam engaging lug $b^1$ arranged at the edge of the cam slot $a^{1''}$ in the knuckle so that when the knuckle is thrown into its coupled position the lug $b^1$ will extend into the cam chamber and project above the shoulder, so that when the pin is lowered, the cam engages with and is supported by such lug, until the knuckle is drawn outward in uncoupling when the cam drops down upon the cam shoulder. When the knuckle is again forced into its coupled position, it engages the cam $d$ and forces it off of the supporting shoulder $a^4$ and the pin drops down through the pin hole. The upper jaw of the drawhead is provided with the groove or lug passage $a^5$ which allows the lug $b^1$ to pass into the cam chamber to engage the cam $d$. The cam $d$ is longer than the thickness of the lug $b^1$ and the groove $a^5$ terminates in the chamber $a^3$ between the shoulder $a^4$ and the pin hole $a$.

In practice the drawhead is cast, being cored to form the chamber $a^3$ and the groove and pin hole, &c., and the pin is then inserted upward from below and brought into position with its shoulder $d'$ above the draw head. Then the washer $d''$ is placed in position and secured by the open ring $d'''$ inserted through the hole $d''''$ thus securing the washer $d''$ in place. The chain $d^5$ by which the pin is operated is fastened to the pin by the ring. The knuckle is pivoted in place by pivot C and the coupling is then ready for use.

To release the coupling from its locked position the pin is drawn upward until the cam $d$ engages the inclined wall $w$ which, upon a further elevation of the pin guides the cam over into position to fall upon the shoulder $a^4$. The pin partially rotates to allow the cam to come into this position. The pin is then allowed to drop and it rests upon the lug $b^1$ of the knuckle and is retained in its elevated position thereby until the knuckle is swung out into its uncoupled position, as shown in Fig. 1 when the cam $d$ drops and rests upon the shoulder $a^4$. When the couplings are brought together and the knuckle is thereby thrown into its coupled position the lug $b^1$ strikes upon the cam $d$ and throws it off of the shoulder $a^4$ thus allowing the pin to fall into position to lock the knuckle in its coupled position.

The upper face $f$ of the cam $d$ is rounded or beveled to cause it to slide freely upon the inclined face $w$ and the under side of said cam is beveled and the upper face of the shoulder $a^4$ is correspondingly beveled sloping downward toward the wall of the chamber from which the shoulder projects, thus to hold the cam firmly when it is in place upon the shoulder.

Now, having described my invention, what I claim as new, and desire to secure by Letters Patent, is—

1. The combination with a draw head provided with a vertical pin hole and a cam slot opening into such pin hole extending from the lower side of such draw head, of the pin provided at its lower end with the projecting cam and provided at its top with a shoulder, the removable washer arranged on such shoulder and the open ring inserted through the pin above the shoulder to retain the washer in place.

2. In a draw head having a vertical pin hole and a cam slot, one wall of such cam slot being provided with a cam sustaining shoulder arranged to receive and support the pin cam to hold the pin elevated above the mouth of the draw head, and having its other wall curved to throw such pin cam into vertical line with the cam shoulder when the pin is fully elevated in the draw head; the pin arradged in the pin hole and provided with the cam arranged to extend into the cam slot, suitable means arranged to disengage the cam from the cam supporting shoulder when the coupling is effected, and suitable means for operating the pin.

3. The combination of the draw head provided with the pin hole, and the cam slot having its upper end arranged to form a cam chamber, one of the walls of such chamber being inclined across the top of such chamber, and having its other wall arranged to form a cam shoulder; the knuckle pivoted in the draw head and provided with a cam operating lug, the pin, provided with the cam, and suitable means for reciprocating the pin.

4. The combination of the draw head provided with the pin hole and the cam slot opening into such pin hole, such slot being widened at the top to form a cam chamber and having one wall inclined across the chamber at the top and having its other wall arranged to form a cam shoulder having its upper face inclined downward away from the slot; the knuckle, pivoted in the draw head and provided on its upper face with the pin operating lug arranged to extend into the cam chamber and to project above the cam shoulder when the knuckle is swung into its coupled position; the pin arranged in the pin hole and provided with the cam arranged to extend into the cam slot, and suitable means for reciprocating the pin.

5. The draw head set forth provided with a knuckle pivoted in such draw head and provided with a vertical pin hole extending through such draw head and through such knuckle when the knuckle is in its coupled position, and provided with a cam slot opening into such pin hole to allow the passage of the pin cam there-along, such slot being widened at its top and having one of its walls arranged slanting at its top to engage the pin cam and to partially rotate such pin when such pin cam is raised to engage the slanting wall of the top of the slot, and having its other wall provided above such knuckle with a cam shoulder arranged to intercept the pin cam in its downward movement, and to support the pin above such knuckle: such knuckle, provided with the pin hole and cam slot and also provided with a cam engaging lug arranged to extend upward above the cam sustaining shoulder of the draw head when the knuckle is in its coupled position to receive and sustain the cam until the knuckle is swung outward to uncouple the coupler, and to engage with and dislodge the cam from the cam sustaining shoulder and allow it to drop through the pin hole and cam slot when such knuckle is swung into its coupled position; and the pin provided on its lower end with the cam arranged to extend into the cam slot, and suitable means for operating the pin.

6. The draw head set forth provided with the knuckle pivoted in such draw head and provided with the vertical pin hole extending through such draw head and through such knuckle when the knuckle is in its coupled position and provided with a cam slot opening into such pin hole to allow the passage of the pin cam therealong, such slot being widened at its top to form a cam chamber and having one of its walls arranged slantingly across the chamber at the top, and having its other wall arranged to form a cam receiving shoulder to intercept the pin cam when the pin is lowered after being reciprocated and partially rotated by the cam engaging with the slanting upper wall of the chamber: the knuckle pivoted in the draw head and provided with the pin hole and the cam slot, and also provided with the cam engaging lug arranged to extend upward into the cam chamber above the cam sustaining shoulder of the draw head when the knuckle is in its coupled position to receive and sustain the cam until the knuckle is swung outward to uncouple the coupler, and to engage the cam when the knuckle is swung into its coupled position to thereby disengage the cam from the cam sustaining shoulder and to allow the pin to drop through the pin hole; the pin provided at its lower end with the cam, and suitable means for reciprocating the pin.

CHAS. W. HINTON.

Witnesses:
   JAMES R. TOWNSEND,
   ALFRED I. TOWNSEND.